Oct. 7, 1969  D. K. SMITH  3,470,914
FLOW INVERSION APPARATUS AND PROCESS
Filed Jan. 4, 1967
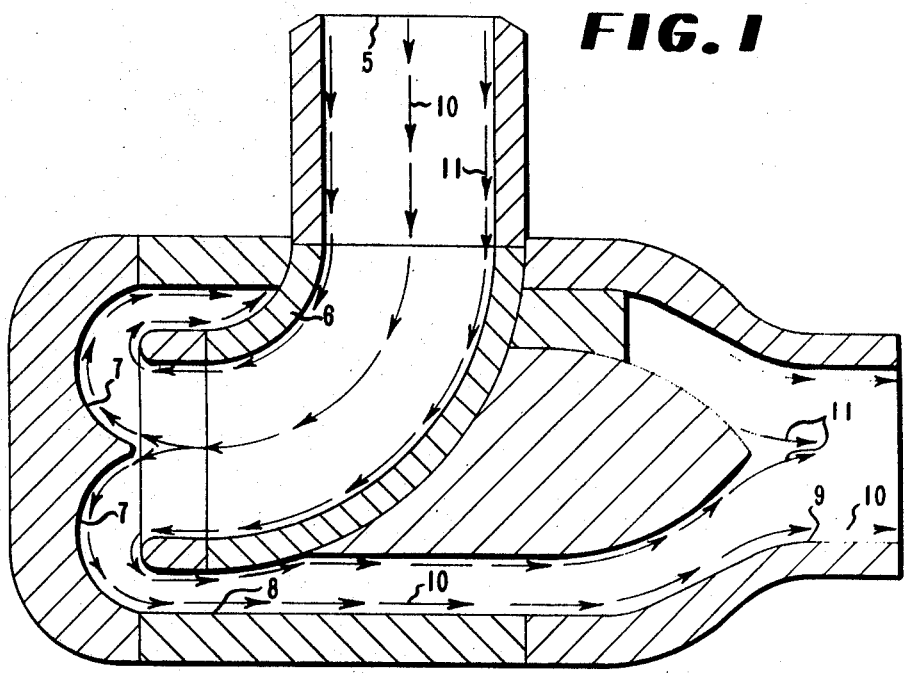
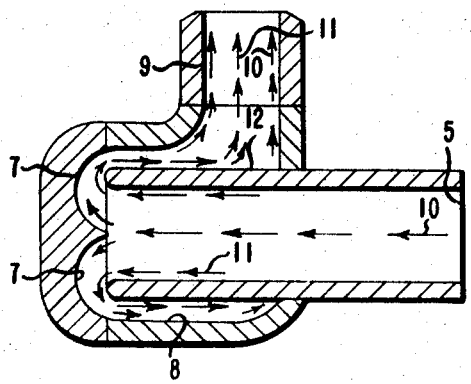
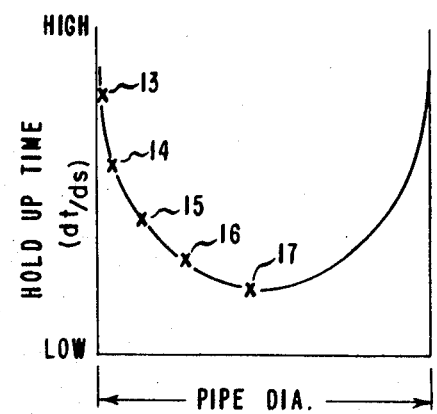
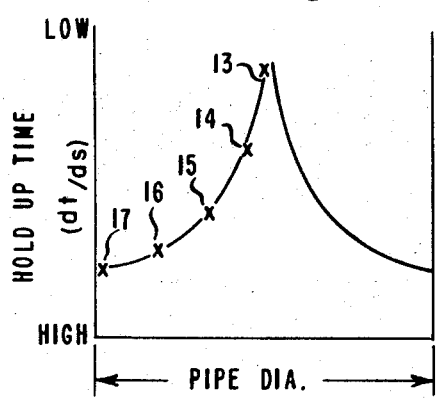
INVENTOR
DREXEL K. SMITH
BY
ATTORNEY

United States Patent Office 3,470,914
Patented Oct. 7, 1969

3,470,914
FLOW INVERSION APPARATUS AND PROCESS
Drexel K. Smith, Kingston, N.C., assignor to E. I. du Pont de Nemours and Company, Wilmington, Del., a corporation of Delaware
Filed Jan. 4, 1967, Ser. No. 607,290
Int. Cl. F15d 1/10; F16l 55/00
U.S. Cl. 138—39          12 Claims

ABSTRACT OF THE DISCLOSURE

This invention relates to the flow of liquids in conduits and, more particularly, to flow inversion means for minimizing the deviation of fluid holdup time from the average for the laminar flow of viscous fluids within conduits.

BACKGROUND OF THE INVENTION
Field of the invention

Viscous liquids flowing in pipelines commonly flow with a parabolic distribution of fluid velocity across the cross-section of the pipe so that the liquid close to the walls of the pipeline is moving at a lower velocity than the liquid in the center of the pipeline. In many fluid processing systems, this distribution of velocity is extremely undesirable because the material flowing near the surface of the pipe resides in the system much longer than the liquid nearer the center.

In certain polymerization processes where molten polymer is transferred from one point to another by means of pipelines, the longer time of residence of the peripheral material can cause it to polymerize to a much higher molecular weight than the material in the center of the pipe. The resulting polymer consequently has an undesirably wide molecular weight distribution.

In other polymerization processes where a polymer degradation is encountered upon holding the polymer in a molten condition, the longer residence time of the peripheral material in the pipeline leads to increased degradation in that portion of the polymer, thereby providing a non-uniform polymer at the pipeline exit.

Description of the prior art

Past attempts to overcome the unequal distribution of holdup times during viscous flow have included the installation of externally driven mixing devices, but such devices are attended by many operating difficulties, as well as being an undesirable additional expense, both for investment and operation. Such devices are also undesirable because high pressure stuffing boxes are required for the entrance of the shaft which operates the mixers. An improved flow inverter has been described recently by Boucher et al. in U.S. Patent 3,128,794, issued Apr. 14, 1964. This inverter provides converging and diverging passages for exchanging polymer across a radius of a pipeline, but careful analysis reveals that the inversion obtained is not "perfect." Furthermore, a considerable pressure drop is encountered across the inverter which is particularly burdensome from an economic viewpoint due to the increased power requirements.

Parr, British Patent 1,012,501, published Dec. 8, 1965 and Sharp, U.S. Patent 3,103,942, that issued Sept. 17, 1963, disclose means for equalizing the holdup time of a viscous liquid that is fed to a series of outlets (spinning positions). In essence, both Parr and Sharp propose that the slower moving outer portion of fluid be withdrawn and conveyed to the more upstream outlets or positions while the faster moving interior fluid (nearer the axis of the conduit) is allowed to travel to the more downstream positions. By a critical calculation of flow rates and the proper spacing of the outlets approximate equal residence time of the fluid may be obtained at the point of discharge. This process represents only an approximation and furthermore it is expensive because of the series of means required for withdrawal of annular portions of the fluid and the transmitting away of such fluid from the entry conduit. Furthermore, the geometric arrangement is calculated and set up for one fluid at certain conditions and would not necessarily provide equal residence time for different types of fluids. Therefore, these processes lack the desired flexibility.

The present invention is flexible in that it will function for any fluid at conditions yielding laminar flow (non-turbulent). The only required change may be the relocation of the inverter within the fluid transmitting system to achieve the maximum flow inversion for a single-stage inversion. With a "perfect" single-stage inverter the residence time of all the fluid in the system cannot be made equal but the flow inverter of this invention offers the maximum single stage inversion possible at the expense of relatively little pressure drop.

SUMMARY OF THE INVENTION

The present invention provides an improved process and improved apparatus for reducing the distribution in holdup time of viscous fluids in laminar flow within a pipe. A process and apparatus are provided which are simple and economical to install and operate and which equalize viscous flow with low pressure drop and without creating turbulence or stagnant areas in the fluid.

In accordance with the invention, a process is provided for redistributing the flow of viscous liquids in conduits which comprises directing the liquid through the open end of a first conduit, spreading the liquid uniformly radially outward over the end portion of the conduit, and directing the fluid in a reverse direction back along the outer surface of the conduit for a distance sufficient to allow the fluid flow streamlines to become substantially constant with regard to the relative position within the chamber cross section which is usually a distance of about one chamber diameter. The flow of the fluid is then directed away from the outer surface of the first conduit into a second conduit whereby the liquid traveling along the axis of the first conduit is diverted outwardly to the walls of the second conduit and the liquid traveling along the periphery of the first conduit is directed inwardly to the axis of the second conduit. Near-perfect inversion of flow is obtained without producing turbulence and with no significant mixing of inner and outer fluids.

The process of the invention is accomplished by combining a conduit system, such as a pipeline, with one or more "flow inverters" located in the system. The flow inverter is a fluid conducting assembly provided with a hollow body member or chamber, an entry conduit, and an exit conduit. The entry conduit projects through the wall of the body member and has an open end directed towards, but spaced from, a smoothly curved, flow-diverting inner surface of the body member. That portion of the entry conduit inside the body member is smaller than the body member to provide a fluid conducting annular space between the outer surface of the conduit and the inner surface of the body member. Contact between the entry conduit and the body member occurs at the point where the conduit projects through the wall of the body member, and at that point a fluid-tight seal is made. The exit conduit is connected to an opening in the body member on a side away from the flow-diverting inner surface and is adapted to receive and transmit fluid from the body member to a downstream pipeline.

In addition, a bullet shaped member may be disposed so as to be aligned with the center portion of the exit conduit and the base of the bullet shaped member attached to the exterior surface of the entry conduit. In this arrangement the bullet shaped member serves as a guide for directing the already inverted flow into the exit conduit and as a means of eliminating possible stagnation areas.

Where the flow inverter is to be operated at a temperature other than room temperature, it is usually desirable to provide the inverter with a heating or cooling jacket. Preferably the jacket forms a fluid-tight annular space provided with connections to receive and transmit a heating or cooling fluid.

BRIEF DESCRIPTION OF THE DRAWINGS

The invention will be more fully understood with reference to the accompanying drawings in which:

FIGURES 1 and 2 are schematic cross-sectional representations of two forms of the flow inverter of this invention.

FIGURE 3 is a diagram of the distribution of fluid holdup time across the pipe diameter immediately before inversion expressed as the derivative of time divided by the derivative of the distance ($dt/ds$).

FIGURE 4 is a diagram showing the redistribution of fluid holdup time expressed as the derivative of the time divided the derivative of the distance ($dt/ds$) and the relocation of the fluid elements (13–17) shown in FIGURE 3 immediately after inversion.

DETAILED DESCRIPTION OF THE DRAWINGS

Referring to FIGURES 1 and 2, a viscous fluid proceeding along a pipeline enters the fluid inverter at 5 where the parabolic distribution of fluid velocity across the diameter of the entry conduit results in a distribution of holdup time similar to that shown in FIGURE 3. The fluid at the axis of the conduit has the greatest velocity and therefore the shortest holdup time while the fluid at the walls of the conduit has the slowest velocity and the longest holdup time. The fluid moves around the smoothly shaped right angle bend 6 and is directed against the end cap 7 which has an interior shape of two smooth curves, preferably the arc of circles, when cut by any plane including the axis of the chamber, with each curved surface intersecting at about the axis of the discharge end of the entry conduit and the outermost portion of the curved surfaces intersecting the interior walls of the chamber. The end cap 7 may also be described as having an interior shape generated by rotating a smooth, concave curve, preferably the arc of a circle, about the axis of the chamber with one end of the curve remaining substantially fixed at the axis and the other end traversing a circular path substantially adjacent the interior surface of the inverter body wall.

End cap 7 directs the fluid outwardly over the terminal edge of the entrance conduit and back along the outside of the entrance conduit, between the outer surface of the entrance conduit and inner surface 8 of the inverter body wall. Fluid proceeding along the outside of the entrance conduit then enters the exit conduit at 9.

The path of the entering axial fluid is indicated by arrows 10 which proceed down the axis of the entrance conduit, then along face 7 of the end cap of the inverter, then along face 8 of the body of the inverter and leave the inverter along the inner face of the exit conduit at 9. The path of the peripheral fluid entering the inverter is indicated by arrows 11. The peripheral fluid flows along the inner wall of the entrance conduit to the end of the conduit, then around the end of the conduit and back along the outer surface of the entrance conduit until the fluid leaves this surface in the vicinity of point 12 and then proceeds along the axis of the exit conduit. As is indicated by the path of the arrows, near-perfect inversion has been achieved because the fluid stream has literally been turned "inside out"; the fluid entering axially has exited peripherally, and that fluid entering peripherally has exited axially. Thus, the slowest moving portion of the entering fluid has been diverted to the fastest moving section of the exit conduit and the fastest moving portion of the entering fluid has been diverted to the slowest moving section of the exit conduit.

Thus, by positioning the flow inverter at the appropriate point in a fluid transfer system, differences in residence time are minimized and fluid subject to changes in composition with time (i.e., by degradation or polymerization) is delivered at the discharge end of the system in a markedly improved degree of uniformity.

The apparatus of this invention is particularly suitable for use in the transfer of molten polymers through pipelines that must be heated to maintain a high temperature, not only because of its uncomplicated design but also because it gives the maximum single stage inversion possible at the expense of relatively little pressure drop.

EXAMPLE I

Corn syrup having a viscosity of 160 poises is pumped through a transparent plastic pipe of 3 in. diameter at a rate of 100 gal./hr. From the plastic pipe the syrup enters a transparent plastic flow inverter constructed in a manner similar to that shown in FIGURE 1. The syrup leaves the inverter and enters a second transparent plastic pipe which leads the syrup into a tank from which the syrup may be recycled into the first pipe. A solution of dye in corn syrup is injected in a fine stream into the syrup in the supply pipe and the path of the dyed syrup followed visually through the flow inverter and into the exit pipe. It is observed that when the dyed syrup is injected into the axis of the supply pipe, it traverses the flow inverter and enters the exit pipe along the inner surface of the pipe that is at the outer periphery of the moving fluid. Conversely, it is observed that when the dyed syrup is injected into the supply pipe at a point adjacent to the inner surface of the pipe wall, the dyed syrup traverses the flow inverter and enters the exit pipe along the axis of that pipe.

The flow inverter provides a low pressure loss of less than about five pipe diameters whereas the conventional and more expensive ones of the prior art provide pressure losses greater than about 60 pipe diameters.

The flow inverter of this invention is effective in decreasing inequalities in the residence time of viscous polymers in conduits and is thus extremely useful in many applications. The inverter is simple to construct, install, and operate. Since it has no moving parts, there is virtually no maintenance involved. This inverter may be constructed from a variety of materials such as various metals, plastics, etc.

It is to be understood that the inner fluid contacting surfaces of the flow inverter are to be streamlined to eliminate edges or obstructions which would cause stagnation points.

The flow inverter of this invention may be used with a reverse orientation to that illustrated in the drawings and examples. In the reverse orientation the entrance conduit becomes the exit conduit and vice versa. Instead of the fluid being directed radially outward by following the path of the arcuate surfaces formed in the end of the chamber it is directed radially inward into the now exit conduit.

The process and apparatus of the invention are useful in pipelines supplying viscous fluids to manifolds where portions of the liquid are removed and directed to different outlets for further processing. In such situations excellent results are achieved when the present invention is used in combination with manifold elements such as those described by Sharp in U.S. 3,103,942, issued Sept. 17, 1963, and by Parr in British Patent 1,012,501, published Dec. 8, 1965.

It is to be understood that the foregoing description is by way of example only and that various modifications and changes in the details may be made without departing from the spirit of the invention.

What is claimed is:

1. An apparatus for minimizing the deviation of fluid holdup time from the average holdup time for the laminar flow of viscous fluids within a pipeline, which comprises:
    (a) an elongated cylindrical chamber having a first fluid opening and a second fluid opening;
    (b) arcuate surfaces concave with respect to the interior of the chamber disposed within the interior of one end of the chamber and extending radially outward from the axis of the chamber, the outermost portion of the surfaces terminating adjacent the interior walls of the chamber such that the tangent lines to the arcuate surfaces at the points of termination are substantially parallel to the longitudinal surface of the interior wall of the chamber and the interior portions of the surfaces terminate adjacent to one another near the central axis of the chamber;
    (c) a cylindrical fluid conducting means entering the chamber through the first fluid opening for directing incoming fluid against the arcuate surfaces, the cylindrical fluid conducting means being disposed in a concentric relationship and having a common longitudinal central axis with respect to the cylindrical chamber, the exterior of the cylindrical fluid conducting means being of a smaller diameter than the interior of the chamber and defining an annular space between the exterior of the cylindrical fluid conducting means and the interior walls of the chamber, the terminal portion of the fluid conducting means being spaced from the arcuate surfaces formed in the end of the chamber with said terminal portion being adjacent to the termination of the arcuate surfaces at the axis of the chamber so that fluid entering the chamber through one fluid opening is reversed in direction of flow and inverted prior to exiting from the chamber through the other fluid opening, the longitudinal axes of the fluid conducting means at the entrance to the chamber through the fluid openings being substantially at right angles to each other.

2. The apparatus as defined in claim 1 wherein the arcuate surfaces are defined by the arcs of circles having radii equal to about one-half the radius of the interior of the chamber and the locus of the centers of the circles is the circumference of a second circle having about the same radius with the center located on the axis of the chamber, the second circle having a plane perpendicular to the axis of the chamber.

3. The apparatus of claim 2 wherein a bullet shaped member having a base portion is attached by its base portion to the exterior of said fluid conducting means and is positioned within the chamber with the axis of the member corresponding to the axis of the portion of the pipeline adjacent the fluid opening for conducting the fluid from the chamber.

4. The apparatus of claim 2 wherein the interior diameter of the fluid conducting means and the diameter of the interior of the chamber have a relative size to provide substantially equal cross-sectional areas in the fluid conducting means and in the annular space defined by the exterior surface of the fluid conducting means and the interior of the chamber walls, whereby the flow rate within each cross-sectional area will be substantially equal.

5. The apparatus as in claim 2 wherein said cylindrical fluid conducting means enters the chamber through the elongated portion of the chamber at a point about midway the length of the chamber and the second fluid opening is located in the end of the chamber opposite the end having the interior convace arcuate surfaces.

6. The apparatus as in claim 2 wherein said cylindrical fluid conducting means enters the chamber through the end opposite the end having the interior concave arcuate surfaces and the second fluid opening is located in the elongated side of the chamber at a position about midway the length of the chamber.

7. In the process of transmitting viscous fluids in laminar flow through a pipeline, the improvement for minimizing the deviation of fluid holdup time from the average holdup time within the pipeline which comprises:
    (a) directing the fluid from the upstream side of the pipeline through the open end of a cylindrical fluid conducting means into an elongated cylindrical chamber;
    (b) spreading the fluid discharging from the fluid conducting means radially outwardly by directing the fluid along the path defined by arcuate surfaces concave with respect to the interior of the chamber and positioned in the end of the chamber with the outermost portions terminating adjacent the chamber walls;
    (c) inverting the fluid flow by directing the fluid through an annular space defined by the exterior of the cylindrical fluid conducting means and the interior walls of the chamber; and
    (d) then discharging the fluid through a fluid opening into the downstream side of the pipeline at a distance from the arcuate surfaces sufficient to allow the flow pattern of the inverted fluid to become substantially established, whereby the fluid flowing axially in the upstream pipeline flows peripherally in the downstream pipeline and vice versa.

8. The process as defined in claim 7 wherein the arcuate surfaces are defined substantially by the arc of circles having radii equal to about one-half the radius of the interior of the chamber and the locus of the centers of the circles is a second circle having about the same radius with the center located on the axis of the chamber, the second circle having a plane perpendicular to the axis of the chamber.

9. The process as defined in claim 7 wherein the fluid is heated while in the chamber.

10. In the process of transmitting viscous fluids in laminar flow through a pipeline, the improvement for minimizing the deviation of fluid holdup time from the average holdup time within the pipeline which comprises:
    (a) directing the fluid from the upstream side of the pipeline into an elongated cylindrical chamber;
    (b) directing the fluid through an annular space within the chamber defined by the interior walls of the chamber and the exterior surface of a cylindrical fluid conducting means centrally and longitudinally positioned within the chamber;
    (c) directing the fluid against arcuate surfaces concave with respect to the interior of the chamber and positioned in the end of the chamber with the outermost portions terminating adjacent the chamber walls;
    (d) converging the fluid radially inward by directing the fluid along the path defined by the arcuate surfaces and toward the entrance to the cylindrical fluid conducting means which is spaced from the arcuate surfaces;
    (e) inverting the fluid flow by directing the fluid through the cylindrical fluid conducting means; and
    (f) then discharging the fluid from the chamber into the downstream portion of the pipeline.

11. The process as defined in claim 10 wherein the arcuate surfaces are defined substantially by the arc of circles having radii equal to about one-half the radius of the interior of the chamber and the locus of the centers of the circles is the circumference of a second circle having the same radius with the center located on the axis of the chamber, the second circle having a plane perpendicular to the axis of the chamber.

12. The process as defined in claim 10 wherein the fluid is heated while in the chamber.

References Cited

UNITED STATES PATENTS

| | | | |
|---|---|---|---|
| 1,041,911 | 10/1912 | Turner | 138—37 X |
| 1,942,598 | 1/1934 | Hewgley | 138—37 X |

HERBERT F. ROSS, Primary Examiner

U.S. Cl. X.R.

137—81.5; 138—37